(12) United States Patent
Sautter et al.

(10) Patent No.: US 10,315,631 B2
(45) Date of Patent: Jun. 11, 2019

(54) METHOD FOR OPERATING A MOTOR VEHICLE BRAKE SYSTEM, AND A CONTROL DEVICE FOR A MOTOR VEHICLE BRAKE SYSTEM

(71) Applicant: Robert Bosch GmbH, Stuttgart (DE)

(72) Inventors: Peter Sautter, Lauffen (DE); Peter Rebholz-Goldmann, Neuenstadt (DE); Andreas Huth, Pleidelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/636,804

(22) Filed: Mar. 3, 2015

(65) Prior Publication Data
US 2015/0251639 A1 Sep. 10, 2015

(30) Foreign Application Priority Data

Mar. 7, 2014 (DE) .......................... 10 2014 204 287

(51) Int. Cl.
| | | |
|---|---|---|
| *B60T 8/174* | (2006.01) | |
| *B60T 17/18* | (2006.01) | |
| *B60T 13/74* | (2006.01) | |
| *B60T 8/88* | (2006.01) | |

(52) U.S. Cl.
CPC .............. *B60T 8/174* (2013.01); *B60T 8/885* (2013.01); *B60T 13/741* (2013.01); *B60T 13/746* (2013.01); *B60T 17/18* (2013.01); *B60T 2270/402* (2013.01)

(58) Field of Classification Search
CPC ........ B60T 8/174; B60T 17/18; B60T 13/741; B60T 13/746; B60T 8/885; B60T 2270/402
See application file for complete search history.

(56) References Cited

U.S. PATENT DOCUMENTS

| | | | | |
|---|---|---|---|---|
| 4,644,180 A | * | 2/1987 | Wickham | ................ B60T 13/74 188/156 |
| 2002/0080663 A1 | * | 6/2002 | Kameyama | ........ H03K 19/0016 365/200 |
| 2002/0129999 A1 | * | 9/2002 | Peter | ....................... B60T 7/107 188/162 |

(Continued)

FOREIGN PATENT DOCUMENTS

| | | |
|---|---|---|
| CN | 1535225 A | 10/2004 |
| CN | 101337548 A | 1/2009 |
| CN | 101445098 A | 6/2009 |

*Primary Examiner* — Redhwan K Mawari
*Assistant Examiner* — Rodney P King
(74) *Attorney, Agent, or Firm* — Maginot, Moore & Beck LLP (57) ABSTRACT

The disclosure relates to a method for operating a motor vehicle brake system that comprises at least one electronic parking brake having at least one actuator, wherein in the presence of a first switching signal at a switching signal input the actuator is controlled so as to activate the parking brake. It is provided that the switching signal input in a normal operating mode is released so as to apply optional switching signals and in a safety operating mode is set to a second switching signal that is different from the first switching signal so that the process of controlling the actuator so as to activating the parking brake is prevented. The disclosure further relates to a control device for a motor vehicle brake system.

5 Claims, 4 Drawing Sheets

(56) References Cited

U.S. PATENT DOCUMENTS

| | | | |
|---|---|---|---|
| 2007/0075657 A1* | 4/2007 | Moller | H02P 5/68 |
| | | | 318/77 |
| 2008/0071458 A1* | 3/2008 | Fukasawa | B60T 7/122 |
| | | | 701/70 |
| 2008/0129234 A1* | 6/2008 | Buente | F03D 7/0224 |
| | | | 318/280 |
| 2008/0294320 A1 | 11/2008 | Amisano et al. | |
| 2010/0050671 A1* | 3/2010 | Kahn | B60H 1/00378 |
| | | | 62/190 |

* cited by examiner

METHOD FOR OPERATING A MOTOR VEHICLE BRAKE SYSTEM, AND A CONTROL DEVICE FOR A MOTOR VEHICLE BRAKE SYSTEM

This application claims priority under 35 U.S.C. § 119 to application no. DE 10 2014 204 287.9, filed on Mar. 7, 2014 in Germany, the disclosure of which is incorporated herein by reference in its entirety.

BACKGROUND

The disclosure relates to a method for operating a motor vehicle brake system that comprises at least one electronic parking brake having at least one actuator, wherein, in the presence of a first switching signal at a switching input, the actuator is controlled so as to activate the parking brake. The disclosure further relates to a control device for a motor vehicle brake system.

The motor vehicle brake system is used to brake or rather decelerate a motor vehicle. The motor vehicle brake system comprises the electronic parking brake that is preferably allocated to an axle of the motor vehicle. The electronic parking brake can be actuated electronically and for this purpose said electronic parking brake comprises the actuator that, in the case of a corresponding control, brakes the axle and consequently the motor vehicle and accordingly secures the motor vehicle in one place. For this purpose, the actuator acts by way of example upon the axle of the motor vehicle. The switching signal input is provided for the purpose of controlling the actuator, wherein different switching signals can be present at said switching signal input. The actuator is thus controlled so as to activate the parking brake and therefore brakes the motor vehicle if the first switching signal is present at the switching signal input. In contrast, the actuator is controlled so as to deactivate or rather release the parking brake or at least to maintain the prevailing state of the parking brake if a second switching signal is present at the switching signal input.

Modern motor vehicles are sometimes equipped with a parking assistant that renders it possible for the motor vehicle to park itself. However, the driver is always in the motor vehicle and can intervene accordingly in emergency situations. It is desirable to improve the parking assistant in such a manner that the motor vehicle can park independently without the driver being on board. In addition, it can be provided that the motor vehicle searches independently for a parking space and subsequently parks in said space. However, if the motor vehicle brake system at least in part fails, the motor vehicle must still be capable of being safely brought to a standstill.

SUMMARY

The method for operating a motor vehicle brake system provides that the motor vehicle can be safely operated in each operating state, in particular in that a braking operation is rendered possible even in the case of a partial failure of the motor vehicle brake system. This safe operation is achieved in accordance with the disclosure in that the switching signal input is released in a normal operating mode so as to apply optional switching signals, and in a safety operating mode a second switching signal that is different to the first switching signal is set so that the process of controlling the actuator so as to activate the parking brake is prevented. The motor vehicle brake system or rather the electronic parking brake can be operated accordingly in at least two operating modes, namely the normal operating mode and also the safety operating mode.

In the normal operating mode, the switching signal input is released so that optional switching signals can be present at the switching signal input. By way of example, the normal operating mode is set if the motor vehicle is to park itself, preferably without the driver on board. Accordingly, in the normal operating mode it must be possible to control the actuator in the case of emergency so as to activate the parking brake in that the first switching signal is applied at the switching signal input. However, it must not be possible during a normal driving operation of the motor vehicle to activate the parking brake in this manner under any circumstances. Accordingly, the safety operating mode is selected during the driving operation in that the switching signal input is set to the second switching signal. This second switching signal is—as mentioned above—selected in such a manner that the actuator is deactivated or rather at least cannot be controlled so as to activate the parking brake. The second switching signal is different from the first switching signal.

In other words, the switching signal input of the switch is connected by way of example to a control unit, a control module and/or a control device. This control means transmits an optional switching signal, in other words in particular selectively the first switching signal or the second switching signal to the switch or rather its switching signal input. In the normal operating mode, the switching signal input follows the applied switching signal so that the switch is controlled according to the switching signal. In contrast, if the safety operating mode is present, the switching signal input is thus set to the second switching signal, in other words said switching signal input cannot follow the applied switching signal arbitrarily or rather cannot switching signal that is different to the second switching signal, in particular cannot follow the first switching signal. In the normal operating mode, the switch is therefore set according to the switching signal that is applied by the control unit, the control module and/or the control device, whereas the switch in the safety operating mode irrespective of the applied switching signal remains in a switching state that corresponds to the second switching signal. The switch or rather its switching signal input is in this respect decoupled from the actually prevailing switching signal and is in this respect set.

The method in accordance with the disclosure can for the large part be implemented in a previously existing control device of the motor vehicle brake system, so that altogether a highly integrated, fully electronic additional function is achieved. By way of example, the method is integrated into a driver or rather a bridge driver of the motor vehicle brake system. In order to fulfil the ASIL-D safety conditions, it can be necessary to provide an external storage device, by way of example a flip-flop, in particular a state-controlled flip-flop in which the prevailing operating state is stored. The storage device establishes in this respect whether the normal operating mode or the safety operating mode is to be applied and said storage device is preferably provided separately from the control device.

One preferred embodiment of the disclosure provides that the actuator can be controlled by means of at least one switch of a switching device, wherein the switch comprises the switching signal input and in the presence of the first switching signal at the switching signal input assumes a first switching state that is intended to activate the parking brake. The switch can be equipped in a fundamentally optional manner. However, it is particularly preferred that the switch is present as a transistor, in particular a field effect transistor, by way of example as a MOSFET. The switch is a component of the switching device that is allocated to the actuator. The switch comprises the switching signal input. If multiple switches are present or rather if multiple switches of the switching device are allocated, each one of the switches thus comprises a switching signal input of this type. If the switches are embodied as transistors, their gate or rather control connector thus represents the switching signal input.

The switch can be present in multiple switching states, in particular in the first switching state and also in a second switching state. The first switching state is intended to activate the parking brake. In the presence of the first switching signal at the switching signal input, the switch switches into its first switching state and remains in this state as long as the first switching signal is applied. In the first switching state, it is rendered possible to actuate the actuator that is intended to activate the parking brake. By way of example, even the presence of the first switching state of the switch is sufficient. Alternatively however, it can also be necessary that further conditions must be fulfilled, by way of example a specific switching signal must be present at the switching signal input of a further switch of the switching device.

One preferred embodiment of the disclosure provides that the switching device comprises multiple switches having in each case a switching signal input, wherein in the safety operating mode of the switching signal input at least one of the switches is set to the second switching signal so that the switch is present in a second switching state that is different to the first switching state. In the case of an embodiment of this type, the multiple switches of the switching device are preferably connected in series to the actuator. It is therefore sufficient in order to achieve the safety operating mode to keep one of the switches in its second switching state, in that the switching signal input of the switch is set to the second switching signal. By way of example, one of the switches is present as a high-side switch and another of the switches is present as a low-side switch, wherein the actuator is arranged between the switches in a manner using switching technology.

A further development of the disclosure provides that the switches of the switching device form an H-bridge arrangement for the actuator, wherein two of the switches are present as low-side switches and their switching signal inputs are connected in the safety operating mode to earth or to source in order to set the switching signal input. The H-bridge arrangement comprises four switches. Two of these switches are embodied as high-side switches, while two others are embodied as low-side switches. In order to prevent the actuator from being activated in the case of an embodiment of the switching device of this type, it is necessary to set either all the low-side switches or alternatively all the high side switches in their second switching state.

For this reason, by way of example the switching signal inputs of the low-side switches or rather all the low side switches are set to the second switching signal in that they are connected to earth or to source. In other words, if the switches are connected to earth, a voltage that deviates from zero should simultaneously be present at the switching signal input, a short circuit to earth is thus present and the corresponding switch remains in its second switching state so that the actuator is not controlled so as to activate the parking brake and in this respect is set. If the switches are connected to source, above mentioned embodiments are to be referred to in a similar manner. In addition or as an alternative to the low-side-switches, the switching signal inputs of the high-side switches in particular all the high side switches of the switching device can naturally also be connected to earth or to source.

If for setting purposes the switching signal inputs are connected to earth, then by way of example switches are used that switch in the presence of source at the signal input whereas they interrupt in the presence of earth. Conversely, if for setting purposes the switching signal inputs are connected to source, switches are used that when source is present at the signal input they interrupt and in the presence of earth they switch.

One preferred embodiment of the disclosure provides that a switch between the normal operating mode and the safety operating mode and also vice versa occurs by means of a state-controlled flip-flop in which the prevailing operating mode is stored. The state-controlled flip-flop can also be described as a "latch". This represents a 1 bit data storage device and comprises by way of example a data input, a data output and also a gate that is present in the form of a second input. The flip-flop works in a first operating mode or a second operating mode in dependence upon the switching signal that is present at the gate. In the first operating mode, the data output follows the data input, in other words said data output always corresponds to this data input. In the second operating mode, the data output is frozen in the state of the data input that prevails at the beginning of the second operating mode. The first operating mode is also described as the transparent phase, the second operating mode is described as a holding phase.

A further embodiment of the disclosure provides that at the beginning of the normal operating mode, at least one of the switches of the H-bridge arrangement, in particular a switch that is present as a high-side switch, is influenced by the first switching signal that is intended for the purpose of activating the parking brake, whereas at least one other switch in particular a switch that is present as a low-side switch is influenced by a second switching signal. In the normal operating mode, it is to be possible to active the parking brake by means of the actuator. Accordingly, the H-bridge arrangement is prepared for an activation of this type in that the one switch is already influenced by the first switching signal.

In order that the parking brake is not directly activated as the switch is influenced, the other switch is simultaneously or even prior to this influenced by the second switching signal. The two switches are arranged in such a manner that said switches are present in the first switching state or rather must be influenced by the first switching signal, therefore the actuator is controlled so at to activate the parking brake. This is the case by way of example if the switches are connected in series to the actuator, in particular if said switches are present as high-side switches and as low-side switches of the actuator.

One advantageous embodiment of the disclosure provides that in the normal operating mode, in the case of an emergency brake signal occurring, the other of the switches is influenced by the first switching signal so that the actuator is controlled so as to actuate the parking brake. The emergency brake signal indicates that the motor vehicle is to be immediately braked. If this emergency brake signal occurs in the normal operating mode, not only the above mentioned one switch but also the other switch is thus influenced by the first switching signal. This effectively leads to activating the parking brake by means of the actuator. If the emergency brake signal occurs in the safety operating mode, it can thus likewise be provided that the switch is influenced by the first switching signal. However, because in accordance with the above embodiments of the switching signal input of the switch, the second switching signal is set, by way of example is connected to earth or to source, this does not have the consequence of activating the parking brake. On the contrary, the emergency signal is ignored. An emergency brake signal that occurs (in error) during the normal driving operation of the motor vehicle does not therefore lead to the driving safety being compromised.

A further development of the disclosure provides that multiple actuators are provided and in the normal operating mode in the case of the emergency brake signal occurring, the switching devices of the actuators are controlled so as to achieve a time-delayed activation. The multiple actuators can be allocated to the same parking brake or alternatively to different parking brakes. The time-delayed activation of the actuators avoids an overload of the motor vehicle brake system, in particular a power supply.

In conclusion, it can be provided that the switching device of the at least one actuator is controlled in accordance with a specific time span and/or in the case of exceeding a specific actuating current so as to deactivate the actuator. The time span is selected in such a manner that, once said time span has elapsed, it can be assumed that the vehicle is held stationary in a reliable manner by means of the parking brake, in other words the parking brake is providing sufficient braking force. Similar to this, the mentioned actuator current is determined in such a manner that if it is exceeded by means of the prevailing current that is flowing through the actuator, it is an indication that the desired braking force has been achieved. Accordingly, the actuator can be deactivated as soon as the specific time span has elapsed and/or the prevailing actuator current exceeds the determined actuator current. The process of deactivating the actuator preferably has the consequence of maintaining a prevailing state of the parking brake. Deactivating the actuator does not therefore cause the parking brake to be released, on the contrary the parking brake remains in its prevailing state.

The disclosure relates in addition to a control device for a motor vehicle brake system, in particular for implementing the method described above, wherein the motor vehicle brake system comprises at least one electronic parking brake having at least one actuator and is embodied so as to control the actuator so as to activate the parking brake in the presence of a first switching signal at a switching signal input. It is provided that the control device is embodied so as to release the switching signal input in a normal operating mode so as to apply optional switching signals and so as in a safety operating mode to set a second switching signal that is different to the first switching signal, so that the process of controlling the actuator so as to activate the parking brake is prevented. The advantages of an embodiment of the control device or rather the method of this type have already been mentioned. Both the control device and also the method can be further developed in accordance with the above embodiments so that in this respect reference is made to said above embodiments. The control device is by way of example a component of the motor vehicle brake system so that the disclosure is also directed at a motor vehicle brake system of this type having the control device in accordance with the above mentioned embodiments.

Alternatively or in addition to the above mentioned embodiments, other forms of embodiments are also feasible. A first alternative involves mechanically locking a transmission of the motor vehicle as soon as the motor vehicle brake system at least in part fails or rather the emergency brake signal occurs. A recognition technology system is to be defined that in the case of a malfunction triggers a mechanical locking arrangement of this type of the transmission. By way of example, the above mentioned described parking brake can be embodied as a transmission brake of this type or rather a transmission locking mechanism. In this case, the parking brake therefore does not engage directly on the axle but rather secures the transmission of the vehicle, in particular in a non-positive locking manner and/or a positive locking manner.

A second alternative represents the implementation of a redundant motor vehicle brake system. This can in the case of a malfunction of the above described motor vehicle brake system assume the braking process in particular in the case of the emergency brake signal occurring. This corresponds to the conventional approach in the aerospace industry but in general is too expensive for the automotive industry. In addition to the motor vehicle brake system and the further motor vehicle brake system that is provided as redundant it is necessary for a coordination system to be present and said coordination system only then activates the further motor vehicle brake system if the motor vehicle brake system comprises a defect.

A third alternative represents a redundant H-bridge arrangement that is not set in accordance with the above mentioned embodiments and as a consequence said H-bridge arrangement in the case of a malfunction in other words in the case of the emergency brake signal occurring, can control the actuator so as to activate the parking brake. However, a releasing arrangement of this type brings about additional component costs and increases the required space on a circuit board that receives the redundant H-bridge arrangement. Accordingly, the above described releasing arrangement in accordance with the disclosure is preferred because this can be used to a large extent in the previously existing control device.

BRIEF DESCRIPTION OF THE DRAWINGS

Exemplary embodiments of the disclosure are presented in the drawings and are explained in more detail in the description below.

In the drawings.

DETAILED DESCRIPTION

Figure 1:
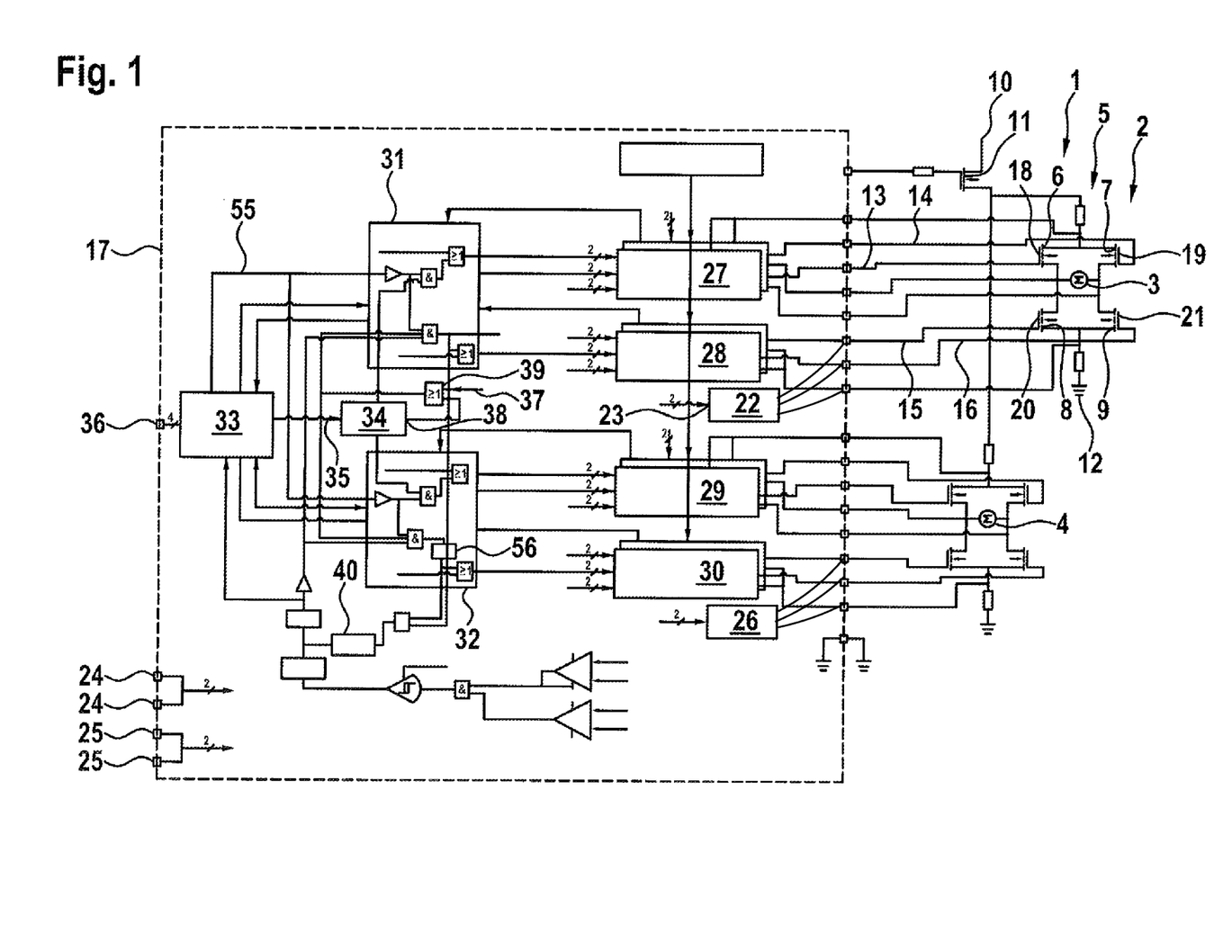
FIG. 1 illustrates a logic diagram or rather circuit diagram of a part of a motor vehicle brake system.

FIG. 1 illustrates a logic diagram of a motor vehicle brake system 1 and also a detail of a circuit diagram of the motor vehicle brake system 1. The motor vehicle brake system 1 comprises an electronic parking brake 2 that in the illustrated exemplary embodiment comprises two actuators 3 and 4. However, it goes without saying that one actuator 3 is already sufficient, a greater number of actuators 3 or rather 4 can also be provided. Hereinunder initially only the actuator 3 is discussed. Reference is to be made to the embodiments in a similar manner for the actuator 4.

The actuator 3 can be controlled by means of a switching device 5 that is present as an H-bridge arrangement and in this respect comprises four switches 6, 7, 8 and 9. The switches 6, 7, 8 and 9 are embodied as transistors, preferably as MOSFETs. The switches 6 and 7 are present as high-side switches, the switches 8 and 9 are present as low-side switches for the actuator 3. In this respect, the switches 6 and 7 are connected on their side that is remote from the actuator 3 to a positive potential, by way of example, to a positive terminal 10. In addition, a further switch 11 can be present between the positive terminal 10 and the switches 6 and 7 and said further switch is used as a main switch and/or as an inverse polarity protection. In contrast, the switches 8 and 9 are connected to a connector 12 on their side that is remote from the actuator 3, an earth is provided by way of said switch. In this respect, the switches 8 and 9 are connected to earth or rather to a negative terminal.

The actuator 3 can be operated with different operating directions by means of accordingly controlling the switches 6, 7, 8 and 9. By way of example, in one of the operating directions, the parking brake 2 is activated, whereas it is deactivated or rather released in another operating direction. The switches 6, 7, 8 and 9 are controlled by way of control lines 13, 14, 15 and 16. These control lines are connected to the described connectors of a control unit 17 of the motor vehicle brake system 1, said connectors not being illustrated in detail. In this respect, it becomes clear that each one of the switches 6, 7, 8 and 9 comprises a switching signal input 18, 19, 20 or rather 21 by way of which it is possible to supply to each switch a specific switching signal. The control unit 17 is present by way of example as an integrated switching circuit, in particular as an ASIC.

In dependence upon the switching signal, the switch 6, 7, 8 or rather 9 assumes a specific switching state. By way of example, a first switching state is present in the case of a first switching signal being applied and a second switching state is present in the case of a second switching signal being applied. The term "first switching signal" is preferably understood to mean a closed state of the switch 6, 7, 8 or rather 9 and the term "second switching state" is understood to mean an opened state of the switch 6, 7, 8 or rather 9. This means that the first switching state is intended to control the actuator 3, in particular so as to activate the parking brake 2, whereas the second switching signal does not provide a control process of this type.

In the illustrated exemplary embodiment, it is always necessary that one of the high-side switches 6 and 7 and also one of the low side switches 8 and 9 are simultaneously present in the first switching state so that the actuator 3 is controlled so as to activate or deactivate the parking brake 2. However, it is preferred that only one of the high side switches 6 and 7 and also one of the low-side switches 8 and 9 are always closed, in other words they assume the first switching state in order to avoid a short circuit. By way of example, the first switching state for the switches 6 and 9 is provided so as to activate the parking brake 2, whereas the switches 7 and 8 must be present in the second switching state. In contrast, the switches 7 and 8 must be present in the first switching state and the switches 6 and 9 in the second switching state in order to deactivate the parking brake 2. It goes without saying that a reversed embodiment can also be provided. Overall, the switches 6, 7, 8 and 9 are always controlled diagonally if the actuator 3 is to be actuated, in particular so as to activate or deactivate the parking brake 2.

It becomes clear that the switches 8 and 9 or rather their switching signal inputs 20 and 21 are connected to a safety device 22 in a manner using switching technology. The safety device 22 can be at least in part and in particular entirely a component of the control unit 17, however, alternatively said safety device can also be provided separately from said control unit. The safety device 22 can be activated by way of an input 23. The input 23 is by way of example connected to connectors 24 of the control unit 17, whereas connectors 25 are allocated to a similarly embodied safety device 26 of the actuator 4.

The safety device 22 or rather 26 is embodied in a manner using switching technology, and in a normal operating mode the switching signal inputs 20 and 21 are released so as to apply optional switching signals and in a safety operating mode are to be set to the second switching signal. In this manner, the process of controlling the actuator 3 so as to activate the parking brake 2 is prevented. By way of example, the switching signal inputs 20 and 21 are set to the second switching signal by virtue of the fact that the switching signal inputs 20 and 21 are connected to earth or source in the safety operating mode. Accordingly, can at the switching signal inputs 20 and 21 no potential that it is intended to switch the corresponding switch 8 or rather 9 effect develop.

Overall, it is therefore provided that in the safety operating mode all the low-side switches 8 and 9 of the switching device 5 are set to the second switching signal so that the corresponding switches 8 and 9 are deactivated or rather are always present in their second switching state. In contrast, the switches 6 and 7 can be in addition independently switched by means of the control unit 17. The desired operating mode of the safety device 22 can by way of example be set by way of the input 23. The operating mode of the safety device is selected from the normal operating mode of the safety operating mode.

The control unit 17 comprises multiple drivers 27, 28, 29 and 30, wherein the drivers 27 and 28 are allocated to the switches 6, 7, 8 and 9 and the drivers 29 and 30 are allocated to the switches of the actuator 4. The drivers 27 and 28 are connected to a controller 31, the drivers 29 and 30 are connected to a controller 32. The two controllers 31 and 32 are controlled by a control module 33 of the control unit 17. The control module 33 is monitored by a watchdog 34 to ensure that said control module is functioning correctly. This is provided along a monitoring path 35. Connectors 36 of the control unit 17 are allocated to the control module 33.

The motor vehicle brake system 1 can in particular be used in order also to be able to perform an emergency braking action in vehicles that are parking automatically without a driver, wherein the devices that are necessary for this process must however not impair a normal driving operation of the motor vehicle. For this reason, in the normal driving operation of the motor vehicle, the safety operating mode is set at the safety device 22 and 26 so that the actuators 3 and 4 are not controlled in an undesired manner and said actuators are embodied by way of example as motors. This is achieved by means of setting the switching signal inputs 20 and 21 for the actuator 3 and accordingly the switching signal inputs of the actuator 4. The setting process is performed by means of connecting to earth the corresponding control lines, in particular the control lines 15 and 16. In a similar manner, it is also possible for the control lines to be connected to source.

In contrast, if it is to be possible to perform an emergency braking action on the motor vehicle, then the motor vehicle brake system 1 is operated in the normal operating mode. In this mode the switching device 5 can be activated automatically so as to control the actuator 3 by way of example in the case of a malfunction of the motor vehicle brake system 1 and/or of an ABS/ESP system, wherein the process of controlling the actuator 3 is intended to activate the parking brake. In order to be able to reliably perform this safety function, the drivers 27, 28, 29 and 30 are preferably supplied with power independently from the ABS/ESP system. The process of identifying the malfunction of the motor vehicle brake system 1 or rather the ABS/ESP system is performed with the aid of the watchdog 34 or is signalled by way of a signal line 37.

An output 38 of the watchdog 34 and the signal line 37 are connected to one another by way of an OR element 30. Both the watchdog 34 as well as the signal line 37 can therefore trigger an emergency brake signal in which case in the normal operating mode, the actuator 3 and/or the actuator 4 is/are controlled so as to activate the parking brake 2. In order to prevent an overload of the actuators 3 and 4, a timer 40 is provided and said timer deactivates the actuators 3 and 4 after a specific time span has elapsed. In addition or alternatively, it can be possible to monitor the prevailing actuator current of the actuators 3 and 4, wherein the actuators 3 and 4 are disconnected as soon as the respective prevailing actuator current has achieved or rather has exceeded a specific actuator current. The process of achieving the specific actuator current corresponds to achieving a specific braking force of the parking brake 2 that in turn indicates whether the motor vehicle can be decelerated, in particular stopped.

Figure 2:
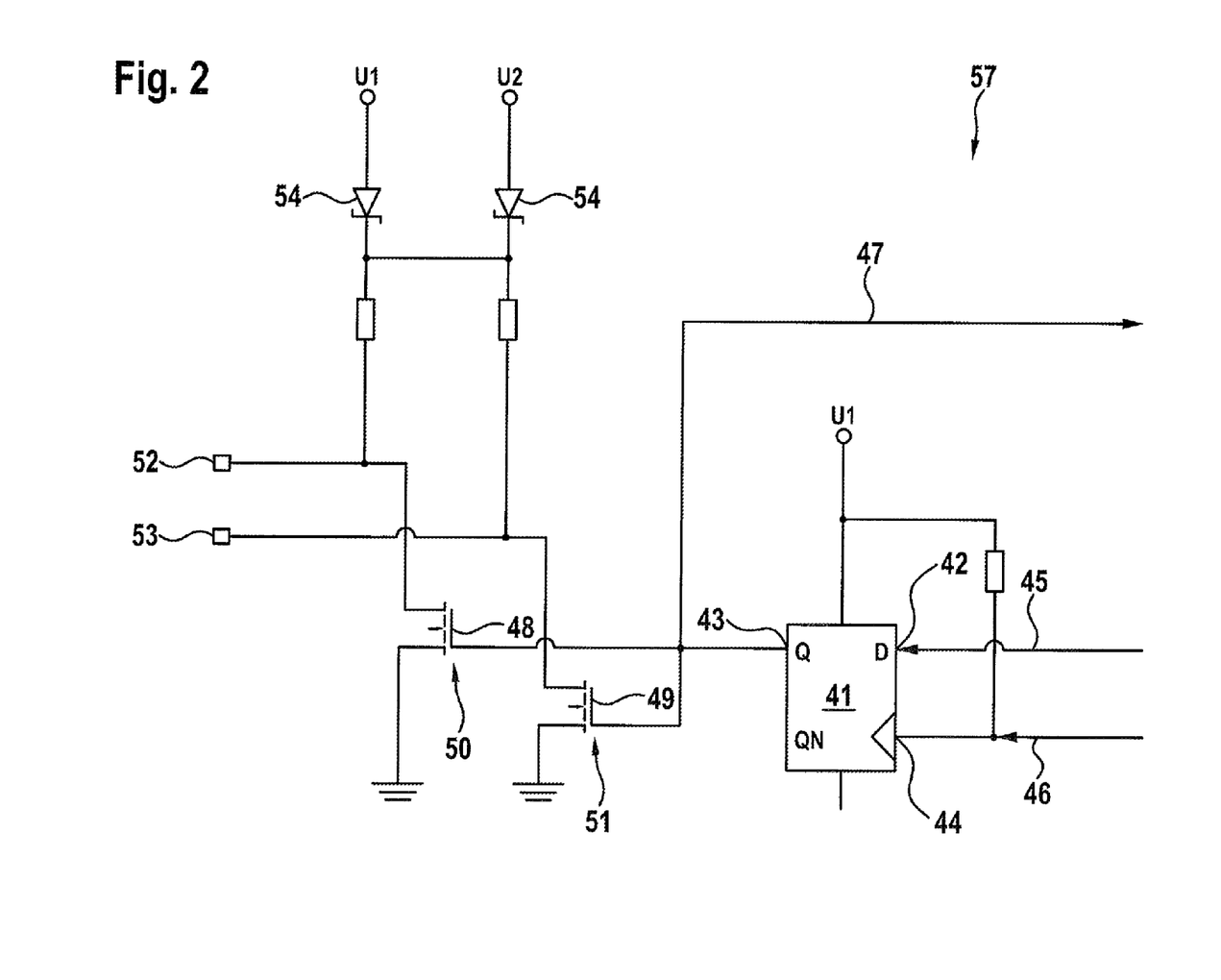
FIG. 2 illustrates a storage device of the motor vehicle brake system.

FIG. 2 illustrates a storage device 57 of the motor vehicle brake system 1. This storage device comprises a state-controlled flip flop 41 that can also be described as a latch. The latch 41 comprises a data input 42, a data output 43 and also a gate 44. The data input 42 and the gate 44 can be controlled by way of data lines 45 and 46. By way of example, the data line 46 is connected or rather can be connected to a voltage source U1. The data output 43 is initially connected to a state line 47 by way of which an indication of the prevailing switching state of the latch 41 is provided. Furthermore, the data output 44 is connected to switching signal inputs 48 and 49 of the two switches 50 and 51.

The switches 50 and 51 are in turn by way of example embodied as transistors, in particular as bipolar transistors or field effect transistors, preferably as MOSFETs. Outputs 52 and 53 are electrically connected by way of example to the connectors 24 and 25 of the control unit 17, in particular permanently. An indirect connection is provided between the outputs 52 and 53 and also the switching signal inputs 20 and 21 of the switches 8 and 9. A redundant supply for the outputs 52 and 53 is provided in addition by way of the diodes 54, wherein the power sources are described by U1 and U2. The prevailing operating mode is also stored in the control module 33. In this respect, a redundant storage of the operating mode is performed by means of the storage device 57 so that the requirements are fulfilled in accordance with ASIL D.

Figure 3:
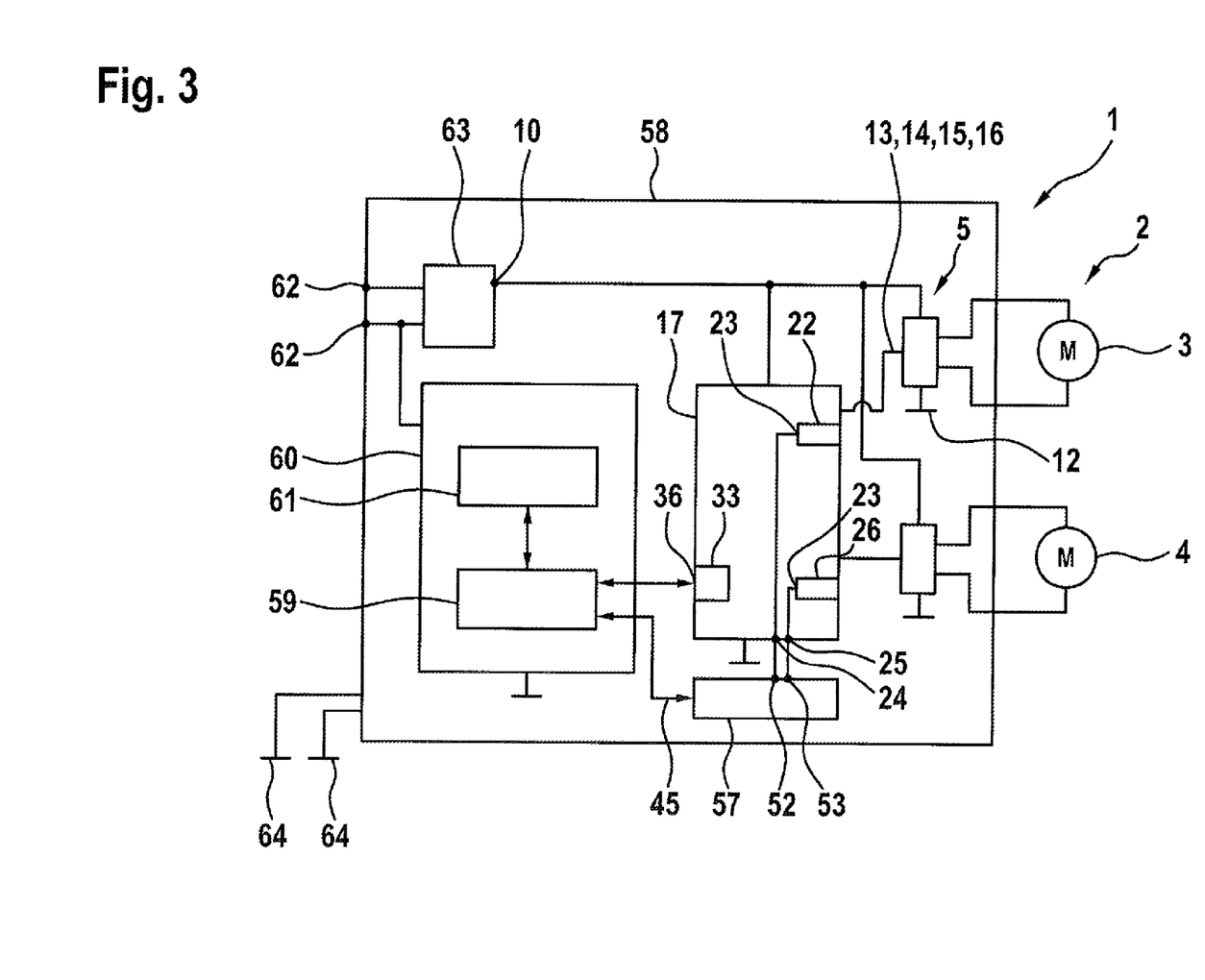
FIG. 3 illustrates schematically the motor vehicle brake system.

FIG. 3 illustrates schematically the motor vehicle brake system 1. It is clear that this comprises a control device 58 that for its part comprises the control unit 17. Furthermore, the control device 58 is allocated a controller 59 that by way of example is a component of a device 60 that can comprise in addition a supply device 61 and/or actuators. The controller 59 is connected both to the control module 33 (by way of the connector 36) as well as the storage device 57 (for example by way of the data line 45) and can therefore control said components. In addition, the control unit 17, in particular the control module 33, can also be connected to the data line 46 and/or the state line 47 of the storage device 57.

The control device 58 comprises voltage inputs 62 by way of which a redundant power supply is achieved. The device 60 or rather the controller 59 is connected to at least one of the voltage inputs 62. The two voltage inputs 62 are connected to the control unit 17 and the switching device 5 or rather multiple switching devices, in particular by way of a switching device 63. Furthermore, the control device 58 can comprise a redundant earth 64 or rather can be connected to said earth. It is clear that the outputs 52 and 53 of the storage device 57 are connected to the connectors 24 and 25 and therefore to inputs 23 of the safety device 22 and 26.

Figure 4:
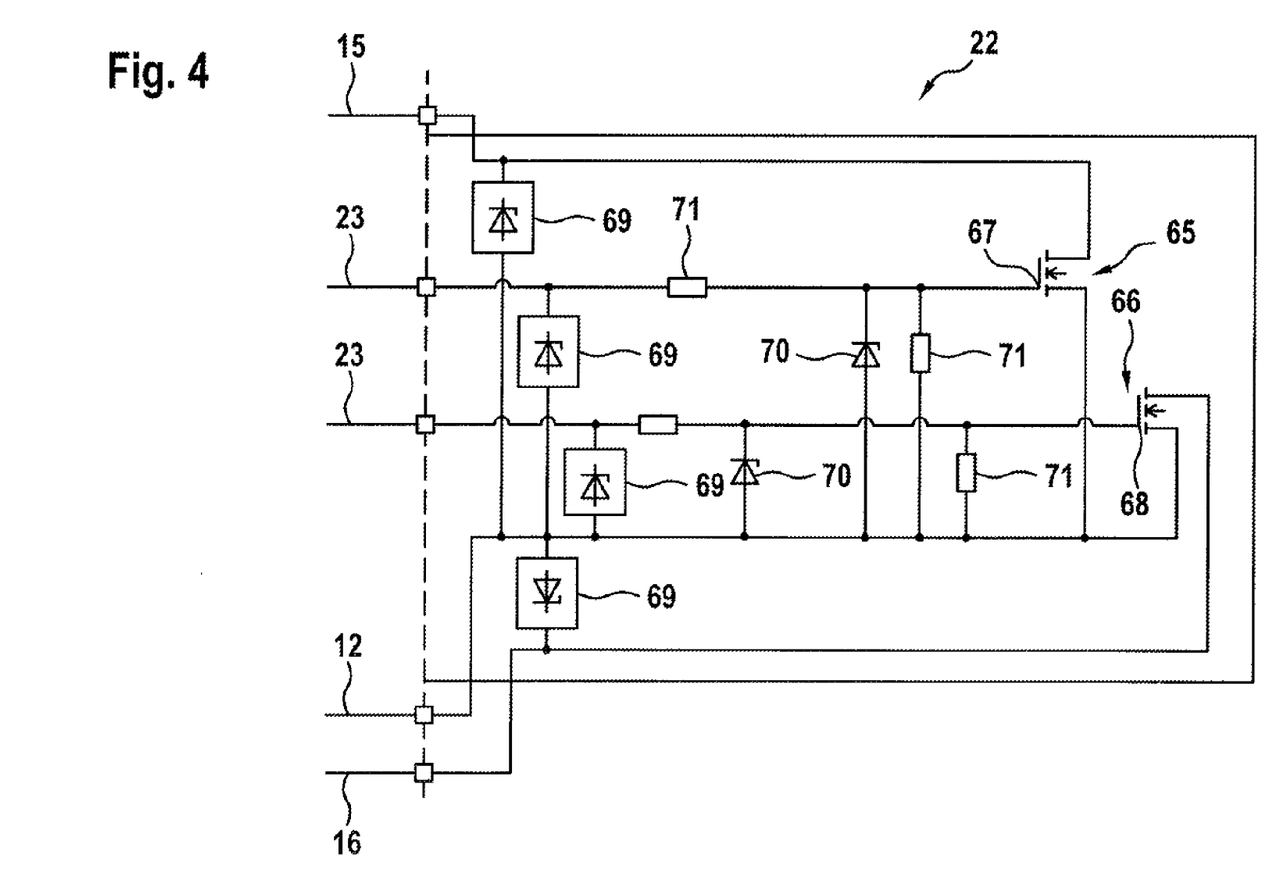
FIG. 4 illustrates a detailed view of a safety device of the motor vehicle brake system.

FIG. 4 illustrates a detailed view of the safety device 22 or rather 26 of the motor vehicle brake system 1. The safety device 22 comprises initially switches 65 and 66 that are by way of example provided as transistors, in particular bipolar transistors or field effect transistors, preferably as MOSFETs. Switching signal inputs 67 and 68 of the switches 65 and 66 are connected to the input 23. It becomes clear that the control line 15 is connected to the connector 12 by way of the switch 65 and the control line 16 is connected to the connector 12 by way of the switch 66 and in this respect can be connected to earth or source. Furthermore, the safety device 22 can optionally comprise at least one, in particular multiple ESD-diodes 69, diodes 70 and/or at least one resistor 71. It goes without saying that reference is to be made to the embodiments in a similar manner for the safety device 26.

As is mentioned above, the safety operating mode is implemented in a driving operation of the motor vehicle. If the mode is to be switched into the normal operating mode, by way of example because the motor vehicle is to park itself, initially the storage device 57 is thus reprogrammed which sets the data output 43 of the latch 41 therefore to a value that closes the switches 50 and 51 so that these connect the outputs 52 and 53 to earth. Subsequently, the control unit 17 is reprogrammed and a signal is output to a line 55 of the control module 33 and said signal leads to the driver 27 closing the switch 6 which is necessary for the purpose of controlling the actuator 3 so as to activate the parking brake 2. Accordingly, the driver 29 moves for the corresponding switch of the actuator 4.

If the emergency brake signal occurs, by way of example at the output 38 of the watchdog 34 or at the signal line 37 and the driver 28 is thus controlled so as to close the switch 8 in particular as long as the timer 40 delivers a positive signal that indicates that the specific time span has not yet elapsed. The actuator 3 is operated and the parking brake 2 is activated as a result of closing the switch 8.

A filter 56 is provided in the controller 32, by means of which a time delay is achieved in such a manner that the driver 30 closes the switch of the actuator 4 in a time-delayed manner with respect to the switch 8. As a consequence, an overload of the power supply is effectively prevented by means of the switch-on current of the actuators 3 and 4. As soon as the timer 40 indicates that the specific time span has elapsed, its signal decreases so that subsequently the switch 8 or rather the corresponding switch of the actuator 4 is opened. In addition or alternatively, a process of determining the prevailing actuator current can be performed by means of the actuator 3 or rather 4. In this case, it is provided that the actuator 3 or rather 4 can be deactivated in the case of the specific actuator current being exceeded by means of the prevailing actuator current. After opening the switch, a signal can be generated or rather set and said signal indicates that an emergency brake signal has been successfully implemented.

What is claimed is:

1. A method for operating a motor vehicle brake system in a vehicle having at least one electronic parking brake and at least one actuator configured to operate the electronic parking brake, the method comprising:

generating, with a controller in the motor vehicle brake system, a first control signal to produce a first output of a latch in a storage device in a first operating mode during operation of the vehicle, the first output of the latch being transmitted to a safety device that is connected to a switching signal input of the at least one actuator to enable operation of the at least one actuator to perform activation and release of the electronic parking brake in response to an input signal generated by a driver being present at the switching signal input in the vehicle brake system; and generating, with the controller, a second control signal to produce a second output with the latch in the storage device in a second operating mode during operation of the vehicle, the second output of the latch being transmitted to the safety device to disable any operation of the at least one actuator to prevent the activation and release of the motor vehicle brake system without regard to the input signal generated by the driver that is connected to the switching signal input in the second operating mode.

2. The method of claim 1 further comprising:

generating, with the safety device, a switching signal to connect a first gate of a first low-side switch transistor of an H-bridge arrangement that is connected to the actuator and a second gate of a second low-side switch transistor of the H-bridge arrangement in the switching device to one of a source or a ground to open both the first low-side switch transistor and the second low-side switch transistor to prevent the H-bridge arrangement from supplying an electrical current to the at least one actuator without regard to input switching signals generated by the driver to the H-bridge arrangement and to disable the at least one actuator.

3. The method of claim 1, further comprising:

operating the safety device to disable the at least one actuator during the first mode in response to activation of the at least one actuator for one of (i) a predetermined time span and (ii) a level of current being applied to the at least one actuator exceeding a predetermined threshold.

4. The method of claim 1 further comprising:

providing the input signal to the switching signal input through a time-delay filter to perform activation and release of the electronic parking brake with a time delay in the first operating mode.

5. A motor vehicle brake system comprising:

at least one actuator operatively connected to a brake in the motor vehicle brake system;

a switching signal input operatively connected to the at least one actuator and configured to receive an input signal;

a driver operatively connected to the switching signal input;

a safety device operatively connected to the switching signal input;

a storage device including a latch operatively connected to the safety device; and a controller operatively connected to the latch, the controller being configured to:

generate a first control signal to produce a first output of the latch in the storage device in a first operating mode during operation of the vehicle, the first output of the latch operating the safety device to enable operation of the at least one actuator in response to an input signal generated by the driver being present at a switching signal input in the vehicle brake system; and generate a second control signal to produce a second output of the latch in the storage device in a second operating mode during operation of the vehicle, the second output of the latch operating the safety device to disable any operation of the at last one actuator to prevent the activation and release of the motor vehicle brake system without regard to the input signal generated by the driver from the switching signal input in the second operating mode.

* * * * *